United States Patent
Bandic et al.

(10) Patent No.: US 8,112,580 B2
(45) Date of Patent: Feb. 7, 2012

(54) DISK DRIVE HAVING MULTIPLE DISK SURFACES ACCESSIBLE BY A READ/WRITE HEAD AND NONVOLATILE MEMORY FOR CONTINUOUS DATA TRANSFER

(75) Inventors: Zvonimir Z. Bandic, San Jose, CA (US); Marco Sanvido, Belmont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 565 days.

(21) Appl. No.: 12/356,070

(22) Filed: Jan. 19, 2009

(65) Prior Publication Data
US 2010/0182716 A1    Jul. 22, 2010

(51) Int. Cl.
*G06F 13/00* (2006.01)
*G06F 13/28* (2006.01)
*G06F 3/00* (2006.01)
*G11B 21/02* (2006.01)

(52) U.S. Cl. ............ 711/112; 711/103; 711/5; 711/157; 711/E12.002; 360/75; 710/9

(58) Field of Classification Search .............. 711/112, 711/103, 5, 157, E12.002; 360/75; 710/9
See application file for complete search history.

(56) References Cited

U.S. PATENT DOCUMENTS
2005/0172067 A1 * 8/2005 Sinclair ................... 711/103
2010/0091408 A1 * 4/2010 Albrecht et al. ............ 360/244

OTHER PUBLICATIONS

IBM Archives: IBM 350 Disk Storage Unit; Product Release Date—Sep. 4, 1956.

\* cited by examiner

*Primary Examiner* — Edward Dudek, Jr.
(74) *Attorney, Agent, or Firm* — Thomas R. Berthold

(57) ABSTRACT

A magnetic recording hard disk drive (HDD) has at least one read/write head that accesses more than one disk surface. The HDD is able to transfer data to and from the host computer seamlessly without interruption during the time the head is being moved from one disk surface to another disk surface. Nonvolatile solid state memory is associated with pairs of disk surfaces. During the time of a head transfer from one disk surface in the pair to the other disk surface, data is read from or written to the associated nonvolatile memory. The data is first read from or written to one disk surface, then from or to the nonvolatile memory, and then, after completion of the head transfer, from or to the other disk surface, thereby allowing seamless uninterrupted transfer of data.

10 Claims, 4 Drawing Sheets

DISK DRIVE HAVING MULTIPLE DISK SURFACES ACCESSIBLE BY A READ/WRITE HEAD AND NONVOLATILE MEMORY FOR CONTINUOUS DATA TRANSFER

BACKGROUND OF THE INVENTION

1. Field of the Invention

This invention relates generally to magnetic recording hard disk drives (HDDs), and more particularly to a HDD that has at least one read/write head capable of accessing more than one disk surface.

2. Description of the Related Art

Magnetic recording hard disk drives (HDDs) have a stack of rigid magnetic recording disks rotated by a spindle motor, and an actuator that moves the read/write heads across the surfaces of the rotating disks, with each disk surface being accessed by an associated read/write head. The disks in the stack are in a fixed position relative to one another and are not movable axially, i.e., in a direction parallel to the axis of rotation of the spindle motor. Each read/write head is formed on an air-bearing slider attached to one end of a suspension, and each suspension is attached at its other end to a rigid arm of the actuator.

The conventional HDD can have high performance, i.e., low access time to read or write data, because all of the read/write heads are located on their associated disk surfaces and available to read or write data. However, the requirement to have a read/write head for each disk surface increases the cost of the HDD. As the need for disk storage increases, there is a desire to reduce the cost of HDDs, where cost is measured in terms of dollars per gigabyte ($/GB) of storage. A large contributor to HDD cost are the read/write heads and their associated assemblies and cabling connections to the HDD electronics. Low-cost HDDs have been proposed that have at least one read/write head that is capable of accessing more than one disk surface. In such an HDD a mechanism is required that moves the head or heads relative to the stack of disks so that the heads can be moved from one disk surface to another disk surface. As the number of disks is increased in this type of HDD, the $/GB decreases substantially while the storage capacity increases. This relationship is similar to that for magnetic tape libraries and optical disk libraries, so this type of HDD has potential application for use as a virtual tape library (VTL).

In this type of HDD where the head must be moved from one disk surface to another disk surface, there is time required to move the head or heads. During this time the disk drive cannot read or write data, so reading and writing must be temporarily halted each time the head is moved to a different disk surface. While this may not be a considerable performance impact when the HDD is used in the conventional manner, i.e., random reads and writes of relatively small files, it can pose a significant disadvantage when the HDD is used for continuous reading or writing of data, as in a VTL, or for reading or writing of large files, like multimedia files, that may be required to be stored on more than one disk surface.

What is needed is a low-cost HDD that has at least one read/write head capable of accessing more than one disk surface, but that does not require suspending the reading and writing of data when the head or heads are being moved from one disk surface to another disk surface.

SUMMARY OF THE INVENTION

The invention relates to a HDD that has at least one read/write head that accesses more than one disk surface and that transfers data to and from the host computer seamlessly without interruption during the time the head is being moved from one disk surface to another disk surface. Nonvolatile solid state memory is associated with pairs of disk surfaces. During the time of a head transfer from one disk surface in the pair to the other disk surface, data is read from or written to the associated nonvolatile memory. The data is first read from or written to one disk surface, then from or to the nonvolatile memory, and then, after completion of the head transfer, from or to the other disk surface, thereby allowing seamless uninterrupted transfer of data.

Each of the disk surfaces has concentric data tracks divided into contiguous physical sectors where the data is stored, with each physical sector being associated with a logical block address (LBA). The nonvolatile memory may have a number of partitions, with each partition being associated with switching from one disk surface in a pair to the other disk surface in the pair. The LBAs are numbered consecutively from one disk surface in the pair, through the memory addresses of the associated nonvolatile memory partition, to the next disk surface in the pair. In one embodiment the HDD may have two read/write heads, with the first head accessing the bottom or back surfaces of the disks in the stack and the second head accessing the top or front surfaces of the disks in the stack, with each back surface of one disk and front surface of the axially adjacent disk forming a "logical" disk. When the heads are moved to the next axial gap, the heads thus access the next logical disk. The LBA numbering is thus continuous from one logical disk, through an associated nonvolatile memory partition, to the next logical disk. The nonvolatile memory may be a single module or chip with multiple partitions or a plurality of modules or chips. The size of the nonvolatile memory or partitions can be determined from the known data transfer rates and the known time to complete the transfer of the head from one disk surface to another disk surface.

For a fuller understanding of the nature and advantages of the present invention, reference should be made to the following detailed description taken together with the accompanying figures.

DETAILED DESCRIPTION OF THE INVENTION

As the need for magnetic recording hard disk storage increases, there is a desire to reduce the cost of hard disk drives (HDDs), where cost is measured in terms of dollars per gigabyte ($/GB). A large contributor to HDD cost is the read/write head and its associated assembly and cabling connection to the HDD electronics. In conventional HDDs there is one head for each disk surface, with all of the heads being attached to a single actuator that moves all the heads simultaneously across their respective disk surfaces. Low-cost HDDs have been proposed that have at least one read/write head that is capable of accessing more than one disk surface. In such an HDD a mechanism is required that moves the head or heads relative to the stack of disks so that the heads can be moved from one disk surface to another disk surface. As the number of disks is increased in this type of HDD, the $/GB decreases substantially while the capacity increases. This relationship is similar to that for magnetic tape libraries and optical disk libraries, so this type of HDD has potential application for use as a virtual tape library (VTL).

The present invention is applicable to any HDD where at least one read/write head accesses more than one disk surface. For example, the very first magnetic recording HDD, the well-known IBM RAMAC 305, had a stack of disks that were fixed relative to one another in a disk stack and a single arm with a read/write head assembly that could be moved from one disk in the stack to another disk in the stack. One type of HDD with a relatively large number of disks, but only two read/write heads, is described in application Ser. No. 12/248, 117, titled "HARD DISK DRIVE WITH DISK SEPARATOR FOR CREATING AXIAL GAPS BETWEEN DISKS FOR ACCESS BY READ/WRITE HEADS", filed Oct. 9, 2008 and assigned to the same assignee as this application. This HDD, which has disks that are movable axially relative to one another in the disk stack, is illustrated in FIGS. 1A-1B and will be briefly summarized below.

Figure 1A:
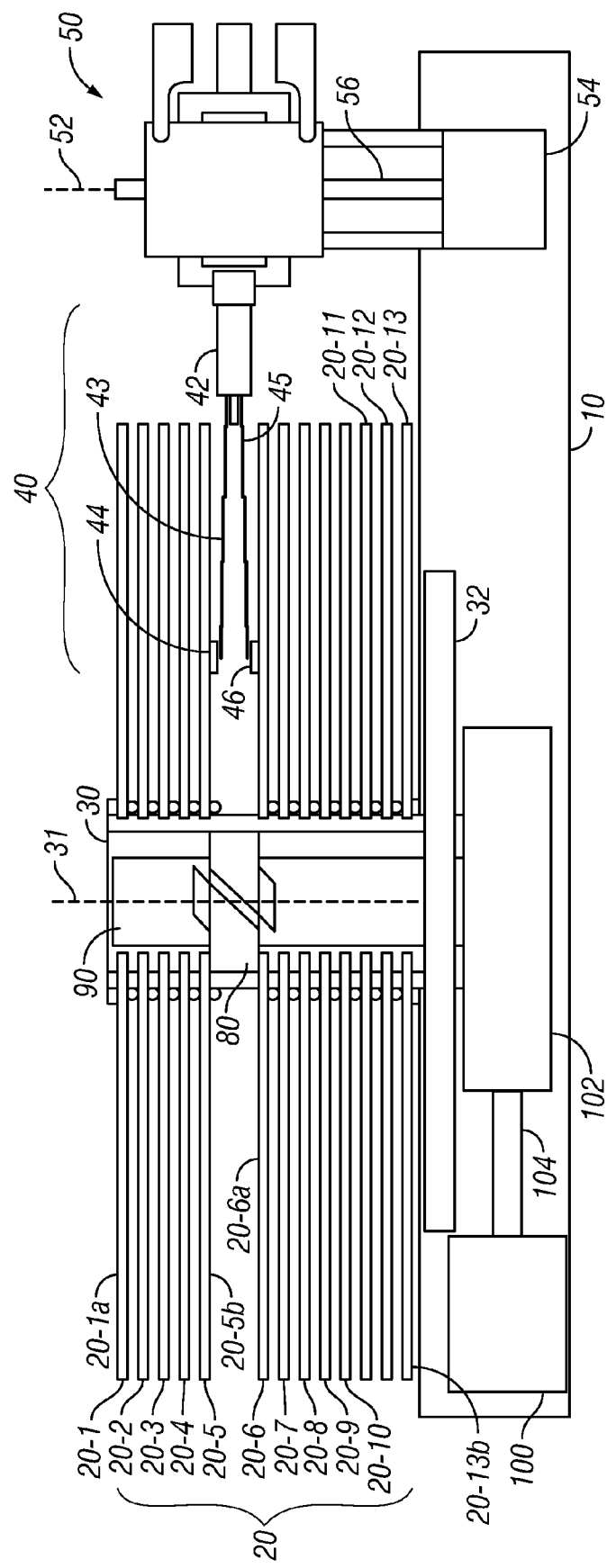
FIGS. 1A-1B are side views of an embodiment of the hard disk drive (HDD) of the invention illustrating two different positions of the head-arm assembly in the stack of axially-movable disks.
Figure 1B:
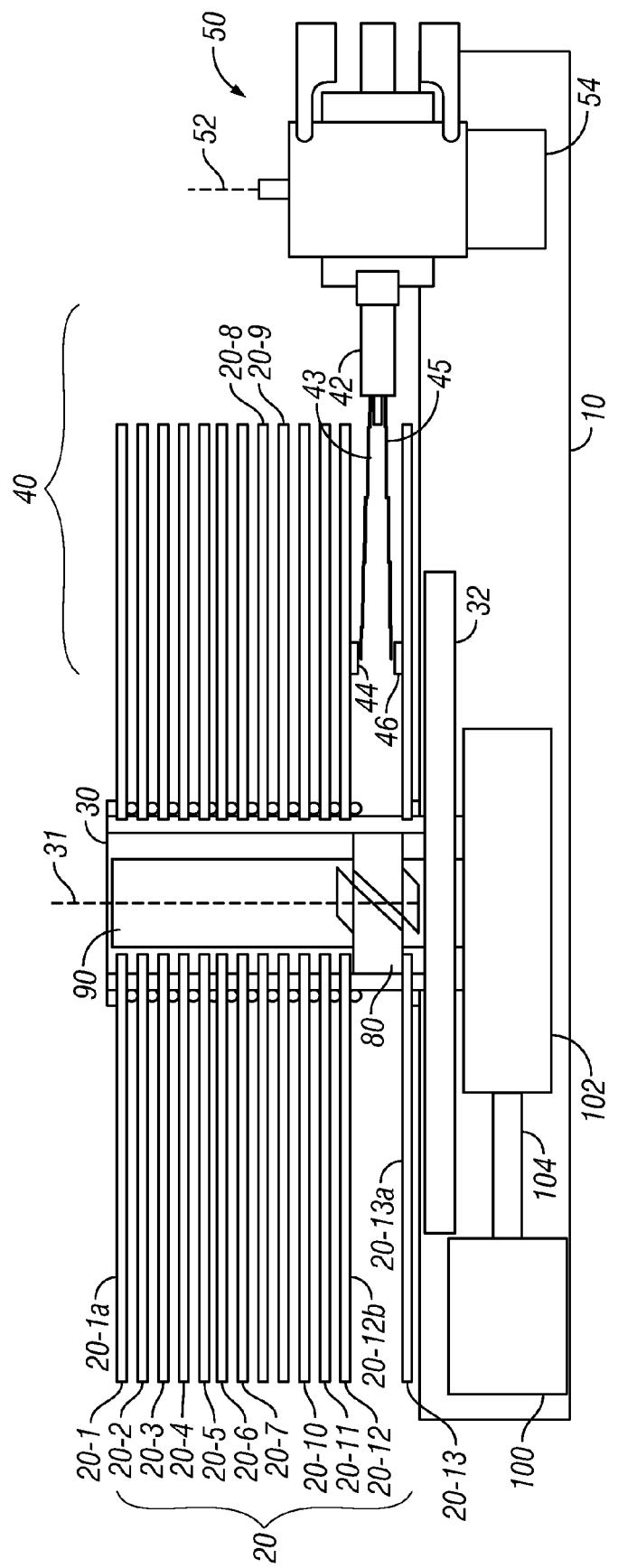

In FIGS. 1A-1B, the HDD has a base 10 with a stack of disks 20 (illustrated for example as 13 disks numbered as disks 20-1 through 20-13) on a rotatable spindle 30, and a single head-arm assembly 40 comprising a rigid arm 42 and two read/write heads on respective air-bearing sliders 44, 46. The spindle 30 is rotated about axis 31 by spindle motor 32 in base 10. Each disk has at least one of its surfaces and preferably both surfaces containing a magnetic recording layer for the storage of data. The sliders 44, 46 are attached to the rigid arm 40 by suspensions 43, 45, respectively. The suspensions 43, 45 include flexure elements that urge the sliders toward their respective disk surfaces, as is well known in the art.

The head-arm assembly 40 is rotatable by actuator 50 about axis 52. The actuator 50 is also movable axially relative to base 10 by an actuator driver 54 to enable the axial height of the head-arm assembly 40 to be changed. The actuator driver 54 may be a stepper motor which is connected to the actuator 52 by a lead screw 56. The axial height adjustment of head-arm assembly 40 relative to base 10 is shown by its two different positions in FIGS. 1A-1B. In FIG. 1A the head-arm assembly 40 is located within the axial gap between disks 20-5 and 20-6 with disk 20-5 having its lower or back data surface 20-5b accessible by the head on slider 44 and disk 20-6 having its upper or front data surface 20-6a accessible by the head on slider 46. In FIG. 1B the head-arm assembly 40 has been moved lower and is located within the axial gap between disks 20-12 and 20-13 with disk 20-12 having its back data surface 20-12b accessible by the head on slider 44 and disk 20-13 having its front surface 20-13a accessible by the head on slider 46.

The disks 20 in the stack are not fixed in permanent positions on the spindle 30, but are movable axially up and down on the spindle 30. This is achieved by a disk separator 80 located inside the spindle 30, which separates any pair of axially-adjacent disks to create an axial gap. The disk separator 80 is attached to a control shaft 90 that causes disk separator 80 to rotate with the control shaft 90 but allows the disk separator 80 to move axially up and down the control shaft 90. The control shaft 90 is located inside the spindle 30 and is rotatable relative to spindle 30. A disk-stack stepper motor 100 in disk base 10 is connected to a differential rotation mechanism 102 by a differential shaft 104 and controls the rotation of control shaft 90 rotate relative to the rotation of spindle 30.

Because the head-arm assembly 40 is movable axially by arm-height stepper motor 54, the sliders 44, 46 can be rotated radially inside the different axial gaps created by different pairs of separated disks. This allows all the disks, except for the pair whose surfaces are being accessed by the heads on sliders 44, 46, to be spaced very closely together to achieve a higher volumetric efficiency than conventional HDDs. For the head-arm assembly 40 to move from the position in FIG. 1A to the position in FIG. 1B, it must first be rotated out of the axial gap between disks 20-5 and 20-6 and beyond the outer circumference of the disk stack. This is achieved by a head support (not shown in FIGS. 1A-1B) that also moves axially with the head-arm assembly 40 but does not rotate with it. This type of head support may be a conventional "load/unload" (L/UL) ramp structure onto which the sliders are "unloaded" off the disk and then later "loaded" onto the disks. After the sliders 44, 46 have been rotated out of the axial gap between disks 20-5 and 20-6 in FIG. 1A and unloaded off disk surfaces 20-5b, 20-6a onto the L/UL ramps, the disk separator 80 creates the new axial gap between disks 20-12 and 20-13 in FIG. 1B. The sliders 44, 46 are then moved off the L/UL ramps and loaded onto the disk surfaces 20-12b, 20-13a in FIG. 1B where they can be rotated across the disk surfaces in the newly-selected axial gap.

In the HDD described in FIGS. 1A-1B, as well as any HDD where the head must be moved from one disk surface to another disk surface, there is time required to make the transfer. During this time the disk drive cannot read or write data, so reading and writing must be temporarily halted each time the head is transferred. While this may not be a considerable performance impact when the HDD is used in the conventional manner, i.e., random reads and writes of relatively small files, it can pose a significant disadvantage when the HDD is used for continuous reading or writing of data, as in a VTL, or for reading or writing of large files, like multimedia files, that may be required to be stored on more than one disk surface.

In this invention, a nonvolatile solid state memory is associated with a pair of disk surfaces. During the time of a head transfer from one disk surface in the pair to the other disk surface, data is read from or written to the associated nonvolatile memory. The data is first read from or written to one disk surface, then from or to the nonvolatile memory and then, after completion of the head transfer, from or to the other disk surface, thereby allowing seamless transfer of data.

Figure 2:
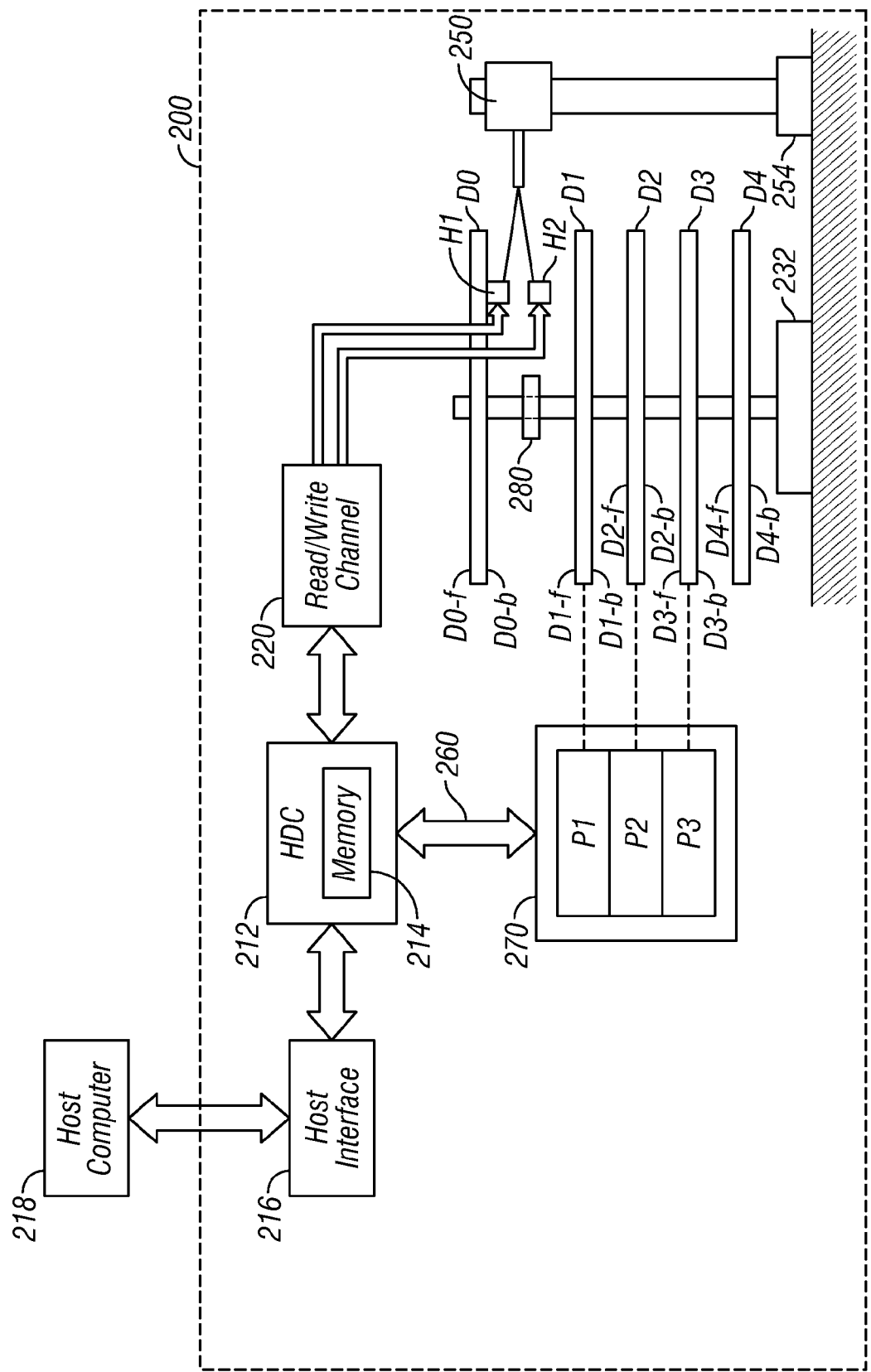
FIG. 2 is a block diagram of the magnetic recording HDD according to the invention showing pairs of disk surfaces and associated partitions of nonvolatile memory.

FIG. 2 is a block diagram of the magnetic recording disk drive (HDD) 200 according to this invention. The HDD 200 includes a hard disk controller (HDC) 212 that can include and/or be implemented by a microcontroller or microprocessor. The controller 212 runs a computer program that is stored in memory 214 and that embodies the logic and algorithms described further below. The memory 214 may be separate from controller 212 or as embedded memory on the controller chip. The computer program may also be implemented in microcode or other type of memory accessible to the controller 212.

The controller 212 is connected to a host interface 216 that communicates with the host computer 218. The host interface 216 may be any conventional computer-HDD interface, such as Serial ATA (Advanced Technology Attachment) or SCSI (Small Computer System Interface).

The controller 212 is also connected to each of the HDD's two read/write heads H1 and H2 through the read/write channel 220. The HDD has N disks numbered from 0 to N−1, with 5 physical magnetic recording disks numbered as disks D0 through disk D4 depicted in FIG. 2. The disks D0-D4 are mounted on and rotated by a spindle motor 232. The disk separator 280 creates the axial gap between axially-adjacent disks, as depicted by the gap between disks D0 and D1 in FIG. 2. Head H1 is associated with and accesses the lower or back surface of the disks, and H2 is associated with and accesses the upper or front surfaces of the disks, as depicted in FIG. 2 with H1 on the back surface of D0 (D0-*b*) and H2 on the front surface of D1 (D1-*f*). Each of the disk surfaces has concentric data tracks divided into contiguous physical sectors where the data is stored, with each physical sector being associated with a logical block address (LBA). Surfaces D0-*b* and D1-*f* together form a "logical" disk, i.e., the LBAs are numbered consecutively across D0-*b* and D1-*f*, so that data can be written or read continuously across all LBAs of the logical disk, with the channel 220 merely switching heads from H1 to H2. Similarly, other front and back surfaces of axially adjacent disks form other logical disks. The actuator 250 moves the heads H1, H2 across the concentric data tracks on the disk surfaces so the heads can access the desired physical sectors where the data is to be read or written. The actuator driver 254 moves the actuator 250 and attached heads H1, H2 axially so the heads can access their associated disk surfaces of different disks in the stack.

The controller 212 acts as a data controller to transfer blocks of write data from the host computer 218 through the read/write channel 220 for writing to the disk surfaces by the heads H1, H2 and to transfer blocks of read data from the disk surfaces back to the host computer 218. The controller 212 also communicates with nonvolatile memory 270 via data bus 260 and thus may transfer blocks of write data to memory addresses and recall or read blocks of data from the memory addresses of the nonvolatile memory 270. One type of nonvolatile memory 270 may be flash memory. Flash memory stores information in an array of floating gate transistors, called "cells", and can be electrically erased and reprogrammed in blocks. Other types of nonvolatile memory may be magnetic random access memory (MRAM) or phase change random access memory.

The nonvolatile memory 270 may have N–2 partitions, where N is the number of disks. As depicted in FIG. 2, the nonvolatile memory 270 has 3 partitions numbered P1 through P3, with each partition associated with switching from one disk surface in the pair to the other disk surface in the pair. P1 is associated with the front and back surfaces of physical disk D1, P2 is associated with the front and back surfaces of physical disk D2, and P3 is associated with the front and back surfaces of physical disk D3. P1 is used when the head assembly is required to be moved axially to switch from the LBAs associated with the logical disk of D0-*b*/D1-*f* to the LBAs associated with the logical disk of D1-*b*/D2-*f*. P2-P4 are used similarly when the head assembly is moved between other logical disks, as depicted in FIG. 2. Each memory address in the partitions of nonvolatile memory 270 is associated with a LBA. While the nonvolatile memory is represented in FIG. 2 as a single module or chip with multiple partitions, the nonvolatile memory may be a plurality of modules or chips. For example, there may be a single flash memory chip associated with each pair of disk surfaces.

Figure 3:
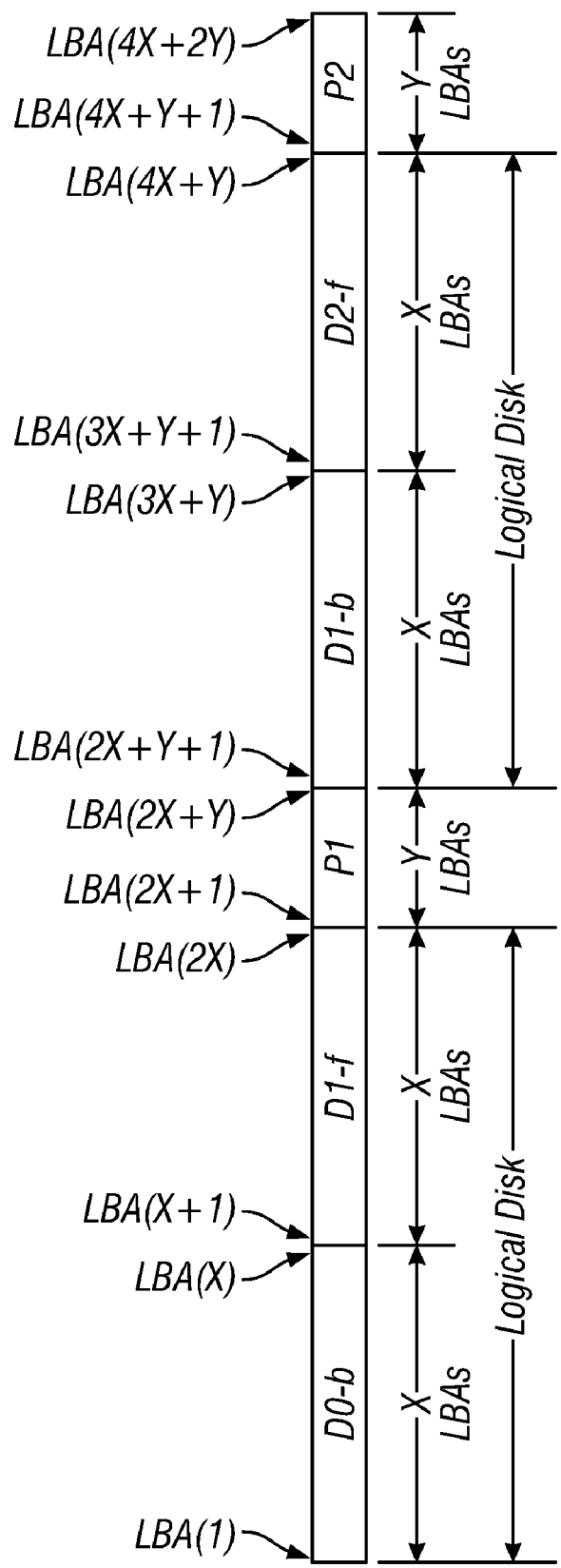
FIG. 3 is a schematic illustrating the consecutive numbering of logical block addresses (LBAs) across multiple disk surfaces and associated nonvolatile memory partitions according to the invention.

In this invention the LBAs are numbered consecutively from one logical disk, through the memory addresses of the associated nonvolatile memory partition, to the next logical disk. For example, the LBAs are numbered consecutively from the back surface of physical disk D0 (D0-*b*), through the front surface of physical disk D1 (D1-*f*), through the memory addresses of the nonvolatile memory or partition P1 of nonvolatile memory, then to the back surface of the physical disk D1 (D1-*b*) and then to the front surface of physical disk D2 (D2-*f*). This is depicted schematically in FIG. 3. In this example, each disk surface has X LBAs and each nonvolatile memory partition has Y LBAs. For example, as shown in FIG. 3, the LBAs are numbered consecutively from LBA(1), the first LBA on D0-*b*, to LBA(X), the last LBA on D0-*b*, to LBA(X+1), the first LBA on D1-*f*, to LBA(2X), the last LBA on D1-*f*. The numbering then continues in the memory addresses of P1 from LBA(2X+1), the first LBA in P1, to LBA(2X+Y), the last LBA of P1, and then to LBA(2X+Y+1), the first LBA on D1-*b*. Numbering continues on D1-*b* to LBA(3X+Y), which is the last LBA on D1-*b*, to LBA(3X+Y+1), which is the first LBA on D2-*f*, to LBA(4X+Y), the last LBA on D2-*f*. The LBA numbering then continues in the memory addresses of P2, from LBA(4X+Y+1), the first LBA in P2, to LBA(4X+2Y), the last LBA in P2. The numbering continues through all of the partitions and their associated pairs of disk surfaces. The LBAs are numbered consecutively in the same manner for each pair of front and back surfaces of disks in the stack and their associated partition. Referring again to FIG. 2, there is no need for a nonvolatile memory associated with disk surface D0-*f* and D4-*b* because in this type of HDD the front surface of the top disk and the back surface of the bottom disk are not accessible by a head and are not used to store data.

When the controller 212 is transferring blocks of write data, such as a large multimedia file, that span the front and back surfaces of a disk, it writes the data consecutively to the LBAs of the front surface disk, then to the LBAs of the associated nonvolatile memory partition, and then to the LBAs of the back surface of the disk. Referring again to FIG. 2, head H2 is initially on the front surface of D1 and controller 212 sends blocks of data to read/write channel 220 that directs them to H2. H2 writes the blocks of data to the LBAs of the front surface of D1. The controller 212 then directs blocks of data via data bus 260 to nonvolatile memory partition P1. During the time that blocks of data are being written to P1, the heads H1, H2 are rotated by the actuator 250 beyond the outer perimeter of the disks D0 and D1, the actuator driver 254 moves the actuator 250 and heads H1, H2 axially, and then the actuator 250 rotates the heads H1, H2 into the axial gap between disks D1 and D2. After completion of the transfer of the heads to the new axial gap, the controller 212 then sends the blocks of data to read/write channel 220 that directs them to head H1, which is now on the back surface of D1 as a result of the head transfer. H1 writes the blocks of data to the LBAs of the back surface of D1. If the file is so large that more LBAs are still needed after all the LBAs of the back surface of D1 have been used, then the read/write channel 220 switches the data transfer to head H2 and blocks of data are written with head H2 on the front surface of D2. Thus the data file is written seamlessly without interruption across multiple disk surfaces and associated nonvolatile memory partitions. The reading of data blocks, i.e., the transfer of stored data from the disk data sectors and nonvolatile memory addresses back to the host computer 218, occurs in the same manner. During the time required to transfer the heads from one axial gap to another axial gap so that the heads can access the different data surfaces, the data blocks are recalled or read from the memory addresses associated with the LBAs of the appropriate nonvolatile memory partitions.

The size of the nonvolatile memory or partitions can be determined from the known data transfer rates and the known time to complete the transfer of the heads from one axial gap to another axial gap. For example, if the data transfer rate is approximately 60 MB/s, and it takes approximately 1 second for an axial head transfer, then each partition may have a capacity of at least 60 MB.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
N magnetic recording disks numbered from 0 to N−1 and rotatable about a common axis, each disk having a front surface and a back surface and at least one disk surface having a plurality of concentric data tracks, each data track including a plurality of contiguous sectors for the storage of data blocks from a host computer, each sector having an associated logical block address (LBA);
a nonvolatile memory having a plurality of addresses for the storage of data blocks from a host computer, each nonvolatile memory address having an associated LBA, wherein the nonvolatile memory has N−2 partitions numbered from 1 to N−2 and associated with disks 1 to N−2, each partition having LBAs numbered consecutively between an LBA on the front surface of its associated disk and the back surface of its associated disk;
first and second read/write heads for writing data blocks to the sectors and reading data blocks from the sectors;
a head actuator connected to the heads for moving the heads across the disk surfaces;
a driver connected to the head actuator for moving the head actuator axially to enable the heads to move in axial gaps between axially-adjacent disks to access different disk surfaces, wherein the first head accesses only the back surfaces of the disks and the second head accesses only the front surfaces of the disks; and
a controller adapted for connection to the host computer for transferring data blocks between the host computer and the sectors on the disk surfaces and addresses in the nonvolatile memory in response to read and write commands from the host computer.

2. The disk drive of claim 1 wherein the controller includes logic for executing method acts comprising, in response to a write command from the host computer:
writing data blocks sequentially with the second head to the LBAs on the front surface of disk 1;
while the driver is moving the head actuator to enable the first head to access the back surface of disk 1, writing data blocks sequentially to the LBAs of partition 1 of the nonvolatile memory; and
while a head is accessing the back surface of disk 1, writing data blocks with the first head sequentially to the LBAs on the back surface of disk 1.

3. The disk drive of claim 1 wherein the controller includes logic for executing method acts comprising, in response to a read command from the host computer:
reading data blocks sequentially with the second head from the LBAs on the front surface of disk 1;
while the driver is moving the head actuator to enable the first head to access the back surface of disk 1, reading data blocks sequentially from the LBAs of partition 1 of the nonvolatile memory; and
while a head is accessing the back surface of disk 1, reading data blocks with the first head sequentially from the LBAs on the back surface of disk 1.

4. A magnetic recording hard disk drive comprising:
a base;
a spindle;
a spindle motor attached to the base for rotating the spindle about an axis of rotation;
a plurality of magnetic recording disks on the spindle, each disk having at least one disk surface having a plurality of concentric data tracks, each data track including a plurality of contiguous sectors for the storage of data blocks from a host computer, each sector having an associated logical block address (LBA);
a nonvolatile memory having a plurality of addresses for the storage of data blocks from a host computer, each nonvolatile memory address having an associated LBA; wherein the LBAs are numbered consecutively from an LBA on a first disk surface through LBAs of the nonvolatile memory to an LBA on a second disk surface;
a disk separator movable axially for separating selected axially-adjacent disks, each pair of axially-adjacent disks defining an axial gap in the disk stack when the disks in a pair are separated;
a rotary actuator on the base and rotatable about an axis generally parallel to the rotational axis of the spindle motor;
a head-arm assembly comprising an arm and at least one read/write head attached to an end of the arm for writing data blocks to the sectors and reading data blocks from the sectors, the head-arm assembly connected to the rotary actuator and rotatable by the rotary actuator generally radially in the axial gaps to enable the head to access tracks on a surface of one of the axially-separated disks;
a driver connected to the rotary actuator for moving the head-arm assembly axially to enable the head-arm assembly to be rotatable in different axial gaps and the head to access different disk surfaces; and
a controller adapted for connection to the host computer for transferring data blocks between the host computer and the sectors on the disk surfaces and addresses in the nonvolatile memory in response to read and write commands from the host computer.

5. The disk drive of claim 4 disk wherein there are N disks numbered axially from 0 to N−1, wherein each disk has a front surface and a back surface, wherein there are first and second heads, wherein the first head accesses only the back surfaces of the disks and the second head accesses only the front surfaces of the disks, wherein the LBAs are numbered consecutively from an LBA on the back surface of disk 0, through an LBA on the front surface of disk 1, through the LBAs of the nonvolatile memory to an LBA on the back surface of disk 1, and wherein the controller includes logic for executing method acts comprising, in response to a write command from the host computer:
writing data blocks sequentially to the LBAs of the front surface of disk 1 with the second head;
while the driver is moving the head actuator to a different axial gap to enable the first head to access the back surface of disk 1, writing data blocks sequentially to the LBAs of the nonvolatile memory; and
writing data blocks sequentially to the LBAs of the back surface of disk 1 with the first head.

6. The disk drive of claim 5 wherein the controller includes logic for executing method acts comprising, in response to a read command from the host computer:
reading data blocks sequentially from the LBAs of the front surface of disk 1 with the second head;

while the driver is moving the head actuator to enable the first head to access the back surface of disk 1, reading data blocks sequentially from the LBAs of the nonvolatile memory; and reading data blocks sequentially from the LBAs of the back surface of disk 1 with the first head.

7. The disk drive of claim 5 wherein the LBAs are further numbered consecutively from an LBA on the back surface of disk 1 to an LBA on the front surface of disk 2.

8. The disk drive of claim 5 wherein the nonvolatile memory has N–2 partitions numbered from 1 to N–2 and associated with disks 1 to N–2, each partition having LBAs numbered consecutively between an LBA on the front surface of its associated disk and the back surface of its associated disk.

9. A magnetic recording disk drive comprising:

N magnetic recording disks numbered from 0 to N–1 and rotatable about a common axis, each disk having a front surface and a back surface and at least one disk surface having a plurality of concentric data tracks, each data track including a plurality of contiguous sectors for the storage of data blocks from a host computer, each sector having an associated logical block address (LBA);

a nonvolatile memory having a plurality of addresses for the storage of data blocks from a host computer, each nonvolatile memory address having an associated LBA, wherein the LBAs are numbered consecutively from an LBA on a first disk surface through LBAs of the nonvolatile memory to an LBA on a second disk surface;

first and second read/write heads for writing data blocks to the sectors and reading data blocks from the sectors;

a head actuator connected to the heads for moving the heads across the disk surfaces;

a driver connected to the head actuator for moving the head actuator axially to enable the heads to move in axial gaps between axially-adjacent disks to access different disk surfaces, wherein the first head accesses only the back surfaces of the disks and the second head accesses only the front surfaces of the disks; and a controller adapted for connection to the host computer for transferring data blocks between the host computer and the sectors on the disk surfaces and addresses in the nonvolatile memory in response to read and write commands from the host computer, wherein the controller includes logic for executing method acts comprising, in response to a write command from the host computer:

writing data blocks sequentially to the LBAs of the front surface of disk 1 with the second head;

while the driver is moving the head actuator to enable the first head to access the back surface of disk 1, writing data blocks sequentially to the LBAs of the nonvolatile memory; and writing data blocks sequentially to the LBAs of the back surface of disk 1 with the first head.

10. The disk drive of claim 9 wherein the LBAs are further numbered consecutively from an LBA on the back surface of disk 1 to an LBA on the front surface of disk 2.

* * * * *